United States Patent [19]

Van Doorn et al.

[11] Patent Number: 5,546,855

[45] Date of Patent: Aug. 20, 1996

[54] AUTOMATIC BALE TYING APPARATUS

[75] Inventors: Donald W. Van Doorn, Columbus; James B. Hawkins, Fortson; Mark D. Cory, Columbus, all of Ga.

[73] Assignee: Lummus Corporation, Columbus, Ga.

[21] Appl. No.: 497,704

[22] Filed: Jun. 30, 1995

[51] Int. Cl.$^6$ ........................................ A01F 15/14
[52] U.S. Cl. .............................. 100/11; 100/25; 100/33 R
[58] Field of Search ................. 100/3,11,25,26,33 R, 100/264

[56] References Cited

U.S. PATENT DOCUMENTS

| | | | |
|---|---|---|---|
| 321,542 | 7/1885 | Sheppard | 100/11 |
| 3,863,558 | 2/1975 | Trumbo | 100/33 R |
| 4,484,518 | 11/1984 | Jaenson | 100/33 R |

*Primary Examiner*—Stephen F. Gerrity
*Attorney, Agent, or Firm*—Veal & Marsh

[57] ABSTRACT

A bale tying apparatus for use with a baling press distinguished from the prior art mechanisms in that the articulated arms which shape wire ties about a bale also incorporate elements on the ends thereof to effect the tying of the wires without engagement of the wires with positioning surfaces in the follow block of the press. Thus the tying function is made more reliable and is independent of the follow block precise positioning. A wire loop on at least one end of the wire tie remains in contact with the arm mechanism until the wire knot is made up. The apparatus may use wire loop holding devices at the ends of both arms or may use a housing carried on the end of one arm with an opening for insertion of the other end by the other arm.

20 Claims, 7 Drawing Sheets

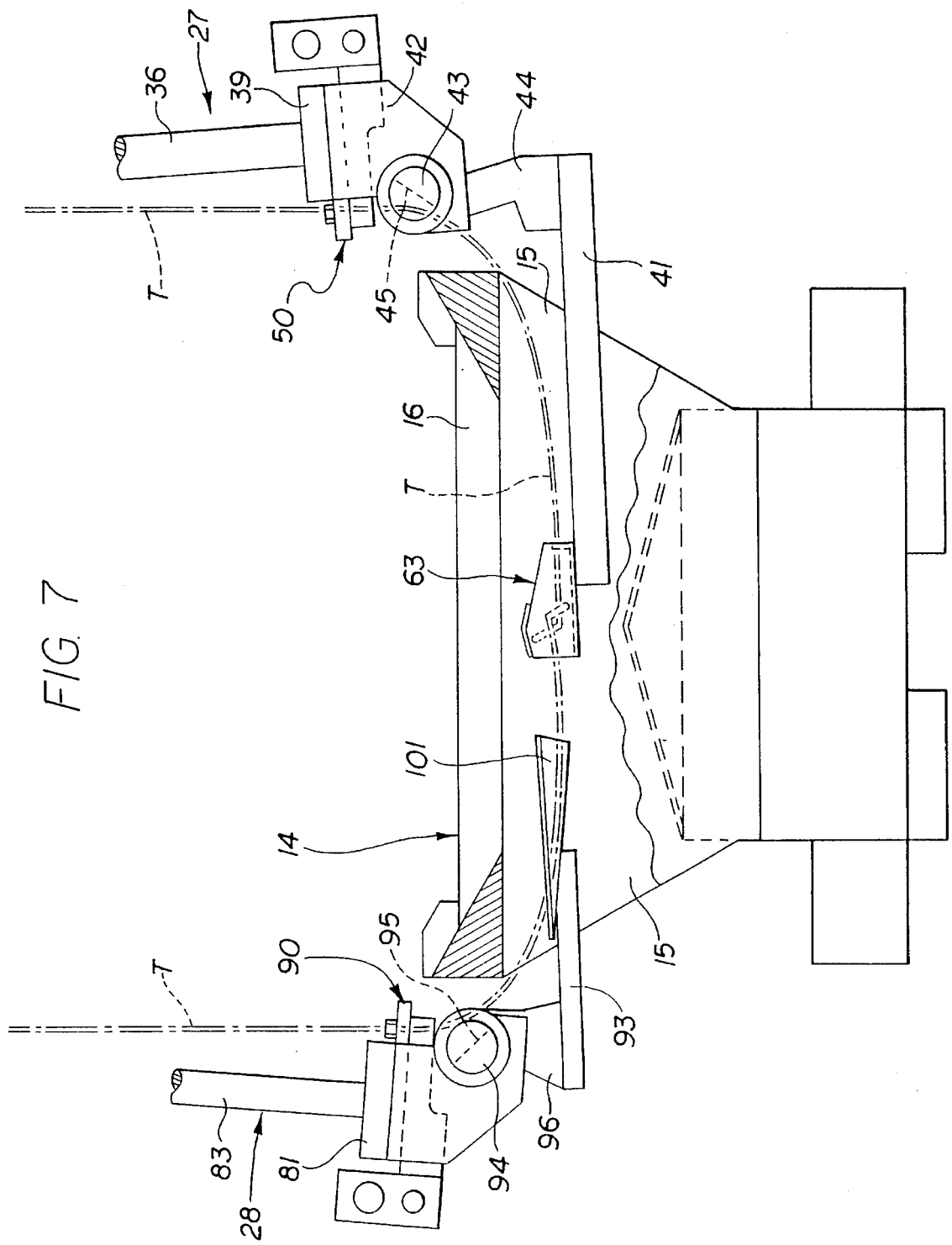

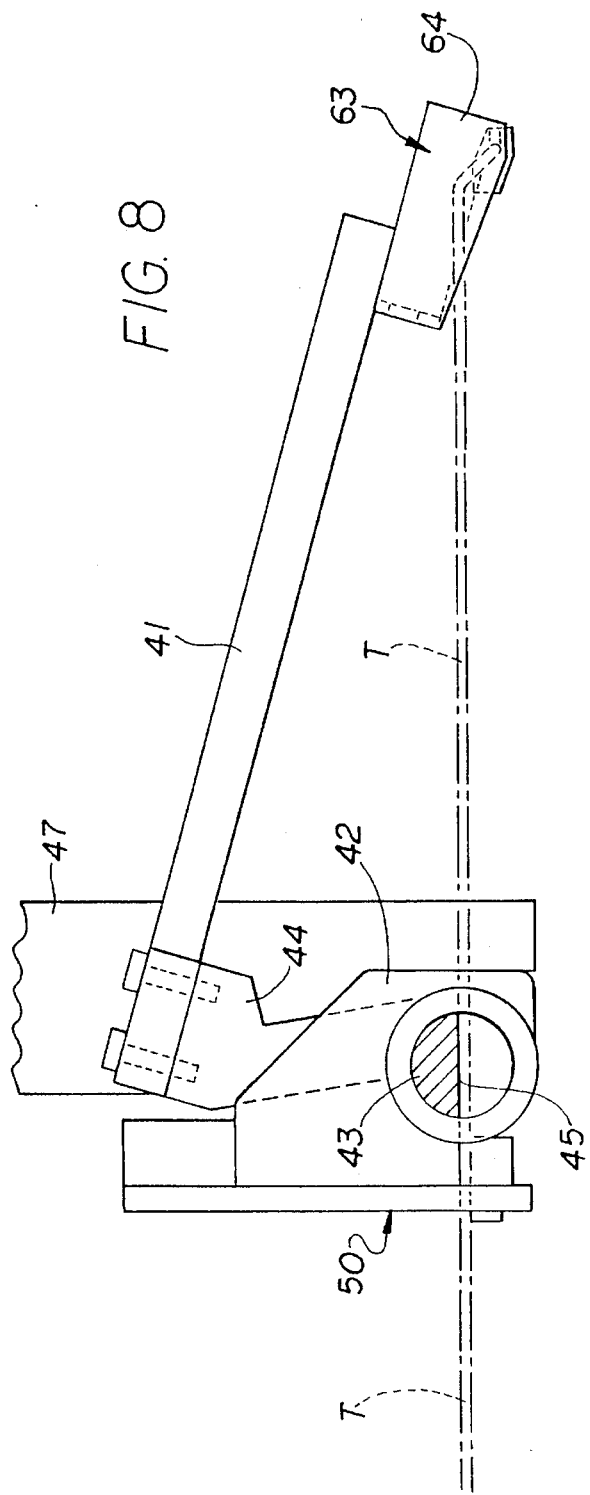
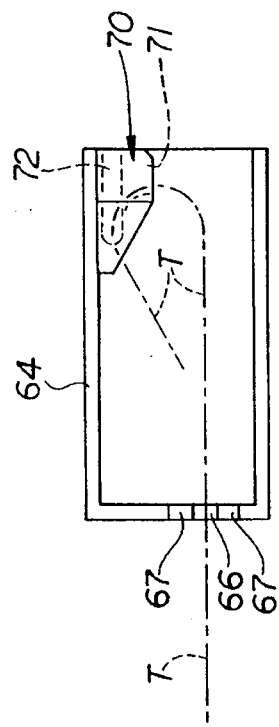
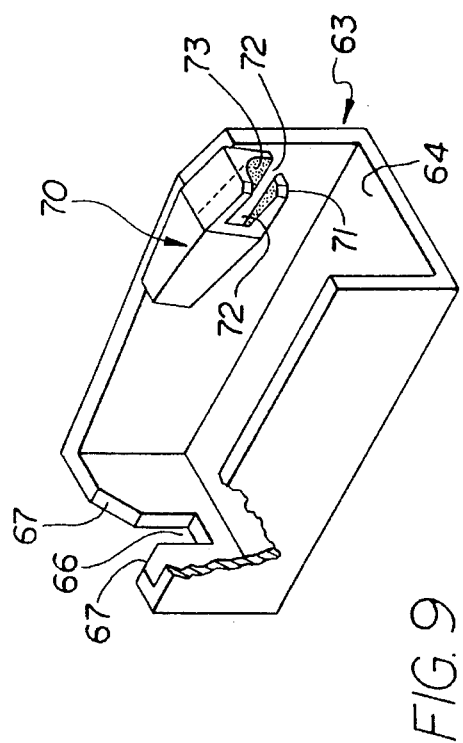

5,546,855

AUTOMATIC BALE TYING APPARATUS

FIELD OF THE INVENTION

The present invention relates to the field of automated baling of materials such as natural and synthetic fiber, recyclable paper or plastic, and other such products. More particularly, the invention relates to automated tying systems used to place bale ties around such bales and, in greater particularity, relates to an apparatus for connecting preformed wire bale ties about a bale while the bale is under compression in a baling machine.

BACKGROUND OF THE INVENTION

In the baling arts, the bale tying technique using preformed wire ties having "shepherd's hooks" on the ends thereof was disclosed as early as 1965 in U.S. Pat. No. 3,168,912. There have been numerous attempts at automating the laborious and time consuming job of connecting the bale ties including the device disclosed by Trumbo in U.S. Pat. No. 3,863,558 and by Jaenson in U.S. Pat. No. 4,484,518. The teachings of U.S. Pat. No. 4,484,518 are incorporated herein by reference.

In an apparatus built in accordance with the '518 patent, it is critical that the follow block of the associated baler be properly positioned for the tying of the wire about the bale to be successful. That is to say, the follow block must be held within close limits in both horizontal directions with follow block guides that wear and require frequent shimming.

Vertically, the follow block must come to a closely controlled, fixed shut height for the wires to successfully tie. Fixed shut height presses are undesirable because lighter weight bales expand more than heavy bales when the ties are removed; thus, in the textile mills, the opening room machinery that plucks the top surfaces of the bales will feed less weight of fiber from the lighter bales thereby causing undesirable variations in the bale blends.

In addition, the '518 patent requires the geometry of the wire bending systems near the ends of the wire to form a sharp bend in the wire to cause the wire ends to push forward of the initial loop positioning device on the load side, and to ensure that both wire ends entering the bottom follow block are horizontal as the wire loops engage, and also, to be able to push the wire loop ends together to make the knot without the bend in the wire yielding. This required action has two major drawbacks. First, the geometry of the bending motion requires that the wires slide along the bending mechanism surfaces. This requires wear resistant surfaces to be added to the bending fingers. Secondly, the sharp bends in the wire cause the wire to be longer than necessary to surround a given size bale under final compression in the press.

In our apparatus we provide geometry for the wire bending systems near the outer ends of the wire that form a gentle bend that results in no relative longitudinal motion of the wire and the bending fingers. This geometry requires that the center of the bending finger shafts be near the center line of the wires when the wires are initially loaded. To accomplish this we provide notches in the bending finger shaft in each wire position. Our wire bending system then first eliminates the wear of the sliding contact of the wire with the bending fingers of patent '518. Secondly, our system allows the gentle curve of the wire to more closely adhere to the lower edges of the bale, thus saving wire length. To further take advantage of the gentle curve formed by our bending system at the lower edges of the bale, we provide tapering surfaces at the outer ends of the bottom follow block platen bars to allow the bend of the wire to pass up into the wire slots in the platen as the wires come together in final knotting position.

Also, the joining of the wires in the prior art device disclosed in the '518 patent is obscured by the bale and since the bottom platen must be raised to make a connection and any modification to the interior surfaces of the wire tie guides in the follow block require dismantling of the follow block by loosening a set of connecting bolts. The bolts are a source of considerable down time inasmuch as they weaken or loosen under stress. Accordingly, there is a need for a more efficient, more reliable, and more easily maintained automated bale tying apparatus.

SUMMARY OF THE INVENTION

The present invention has as its principal object the provision of a bale press with an automatic tying device which yields a more uniformly compressed bale than prior automated systems.

Yet another object of the invention is to improve the serviceability of the tying apparatus such that the tying mechanism may be easily adjusted and serviced.

Yet another object of the invention is to reduce the hydraulic force required to compress the bale for containment by a set of standard length wire ties.

These and other advantages are accomplished in the present invention by utilizing some aspects of the teachings of the '518 patent, and improving on the tying mechanism itself. More particularly, the present invention is distinguished from the prior art mechanism in that the articulated arms which shape the wire ties about the bale also incorporate means on the ends thereof to effect the tying of the wires without engagement of the wires with positioning surfaces in the follow block. Consequently, the wire loop on at least one end of the wire tie remains in contact with the arm mechanism until the wire loops are joined. Thus, in one embodiment we may use wire loop holding devices at the ends of both arms. In another embodiment, we may use a wire loop holding device combined with a housing carried on the end of one arm with an opening for insertion of the other wire end by the other arm. In such instances, the contours of the interior surfaces of the housing force the wire loops to join together.

BRIEF DESCRIPTION OF THE DRAWINGS

Apparatus embodying features of our invention are depicted in the accompanying drawings which form a portion of this disclosure and wherein:

FIG. 6 is a bottom perspective view of a wire engaging mechanism mounted on a load finger;

FIG. 7 is a side elevational view, partially broken away, of the lower platen receiving the load and exit fingers of the present invention;

FIG. 8 is a side elevational view of an alternate embodiment of a wire engaging mechanism mounted on a load finger;

FIG. 9 is a perspective view of the interior components of the wire engaging mechanism shown in FIG. 8; and, FIG. 10 is a bottom view of the wire engaging mechanism shown in FIG. 8.

DESCRIPTION OF A PREFERRED EMBODIMENT

Figure 1:
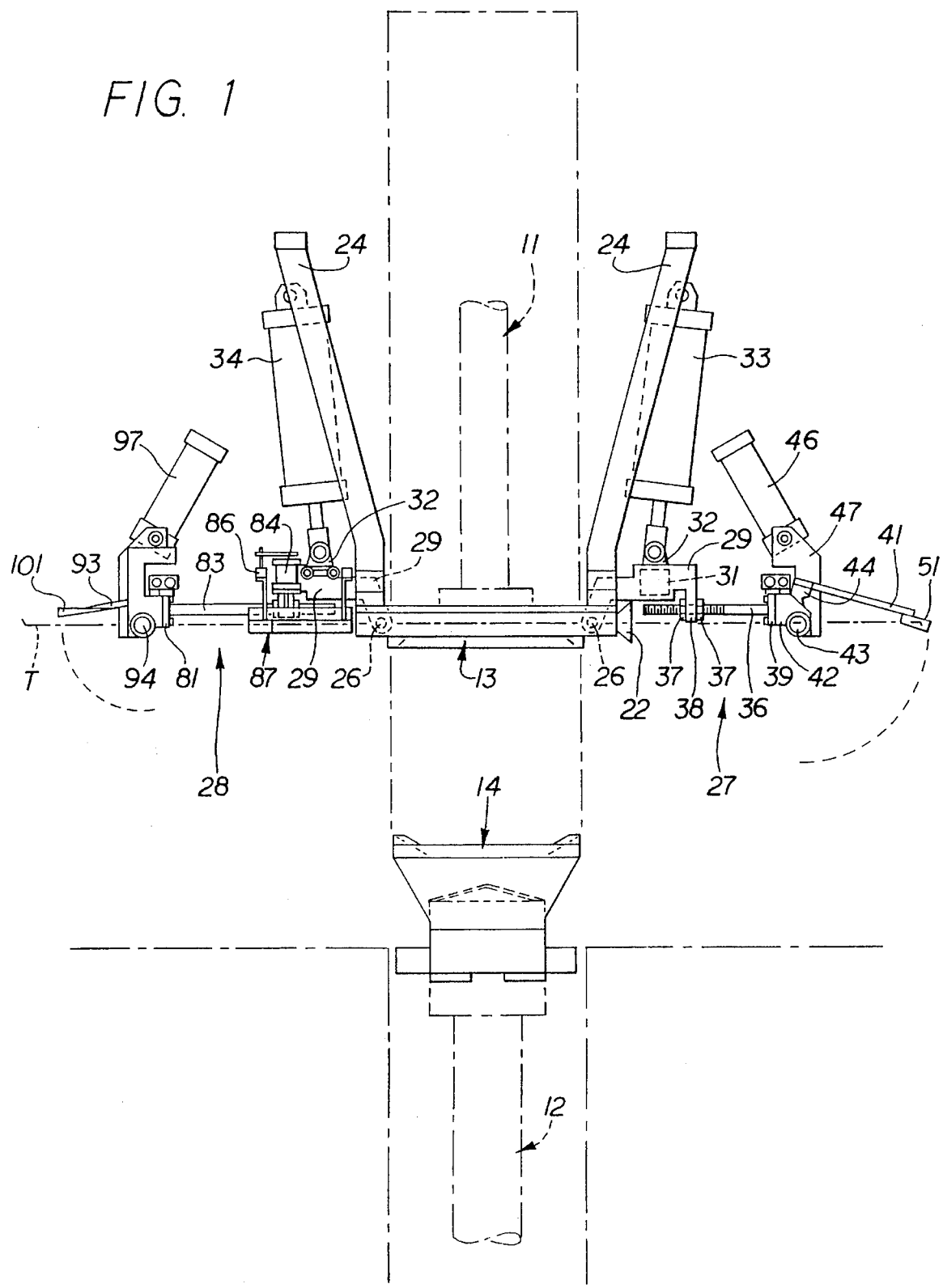
FIG. 1 is a side elevational view of an embodiment of an automatic bale tying apparatus shown in the arm raised position mounted on a baling press for tying a plurality of wire ties about a bale formed in the press.
Figure 2:
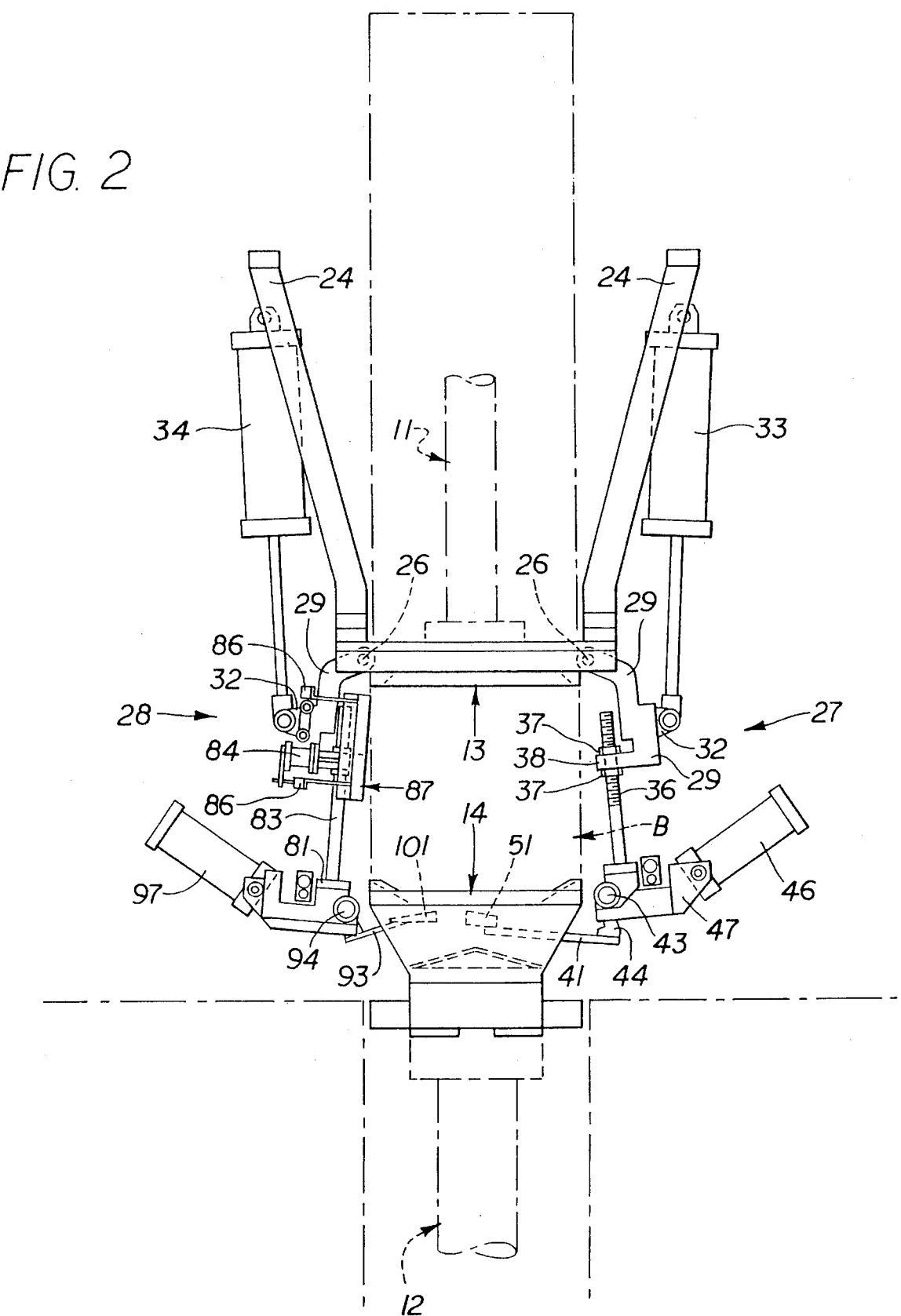
FIG. 2 is a side elevational view of the automatic bale tying apparatus shown in the arm lowered position.
Figure 3:
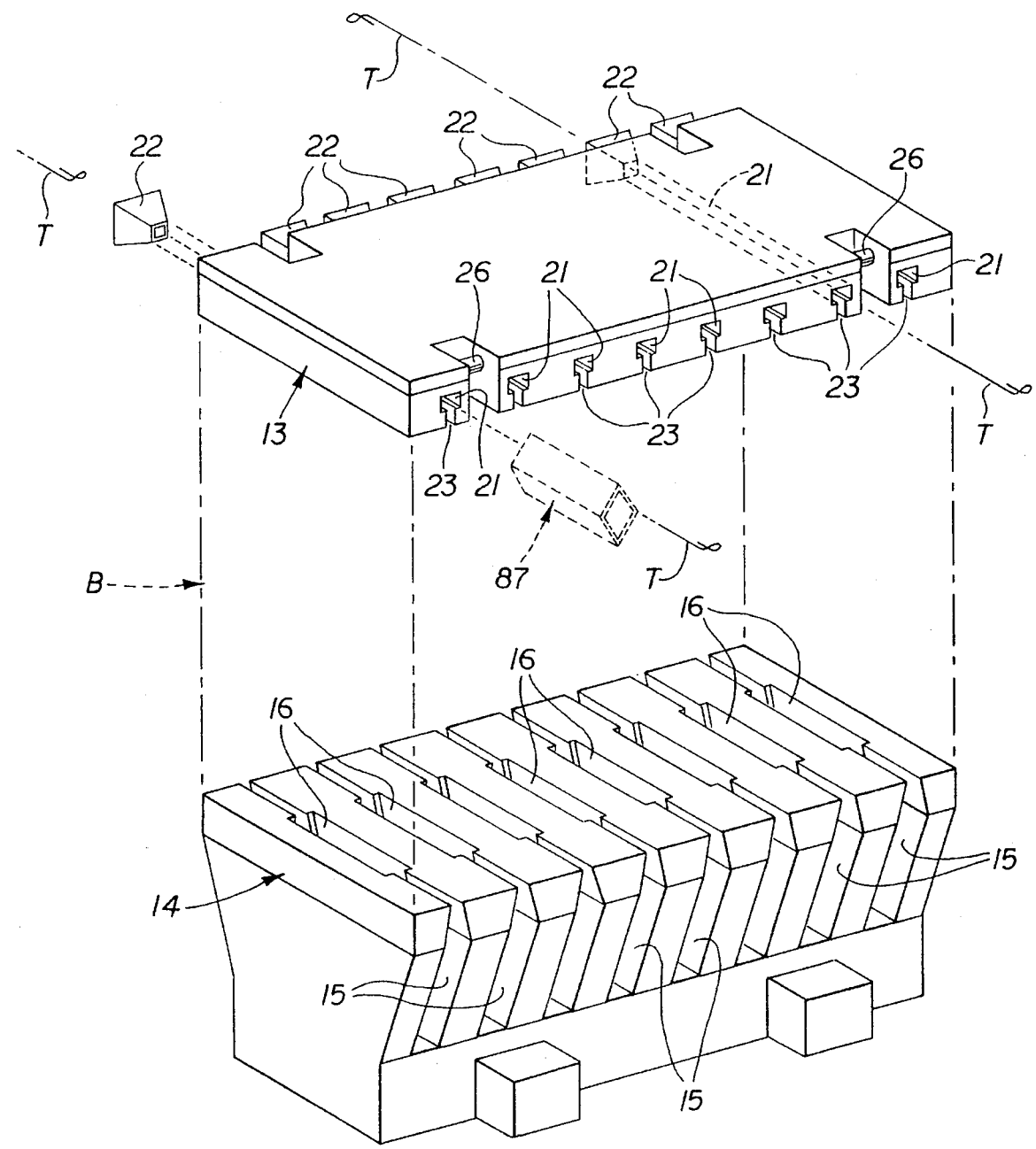
FIG. 3 is a perspective view of the upper and lower platen assemblies employed with the present invention.

Referring to the Figures for a clearer understanding of the invention, it will be seen in the preferred embodiment shown in FIG. 1 that the present invention is an improvement in baling presses, wherein an upper ram 11 and a lower ram 12 are used to compress a bale B of material therebetween. Each ram 11 and 12 terminates in a platen assembly 13 and 14 which cooperate with the walls of the baling press to form the bale in a well known manner. In contradistinction to the '518 patent, the lower platen assembly or follow block 14 does not have a wire tying mechanism built into it. Rather, the follow block has passages 15 as shown in FIG. 3 which accommodate the entry of the wire tying apparatus thereinto to accomplish tying beneath the bale. Passages 15 include upwardly opening slots 16 running across the platen to allow the tie T to exit the platen after the bale has been tied. To accomplish tying, the present invention uses finger carried tying mechanisms as will be more fully described hereinafter.

With reference to FIG. 3, it may be seen that the upper platen assembly 13 includes a plurality of channels 21 formed in the upper platen, each having an associated entry chute 22 aligned therewith and flaring outwardly therefrom on the side of the baling press on which a human operator would be stationed, hereinafter referred to as the load side. The operator would load the wire ties by inserting them into the chutes and passing the tie through the platen to the opposite side of the platen which will be referred to as the exit side. Each channel 21 opens downwardly through an associated slot 23.

As may also be seen, the platen assembly 13 carries an arm cylinder bracket 24 on both the exit side and load side, such that the brackets are firmly affixed to the platen. Likewise, the platen assembly 13 carries hinge pins 26 which support arm assemblies 27 and 28 on the load and exit sides respectively. The arm assemblies include a pair of pivot members 29 supported on the hinge pins 26 and connected by a tubing 31 parallel to the pins 26. Tubing 31 carries an eye 32 and other suitable connection means such that air cylinders 33 and 34 can be connected between brackets 24 and arm assemblies 27 and 28.

Figure 4:
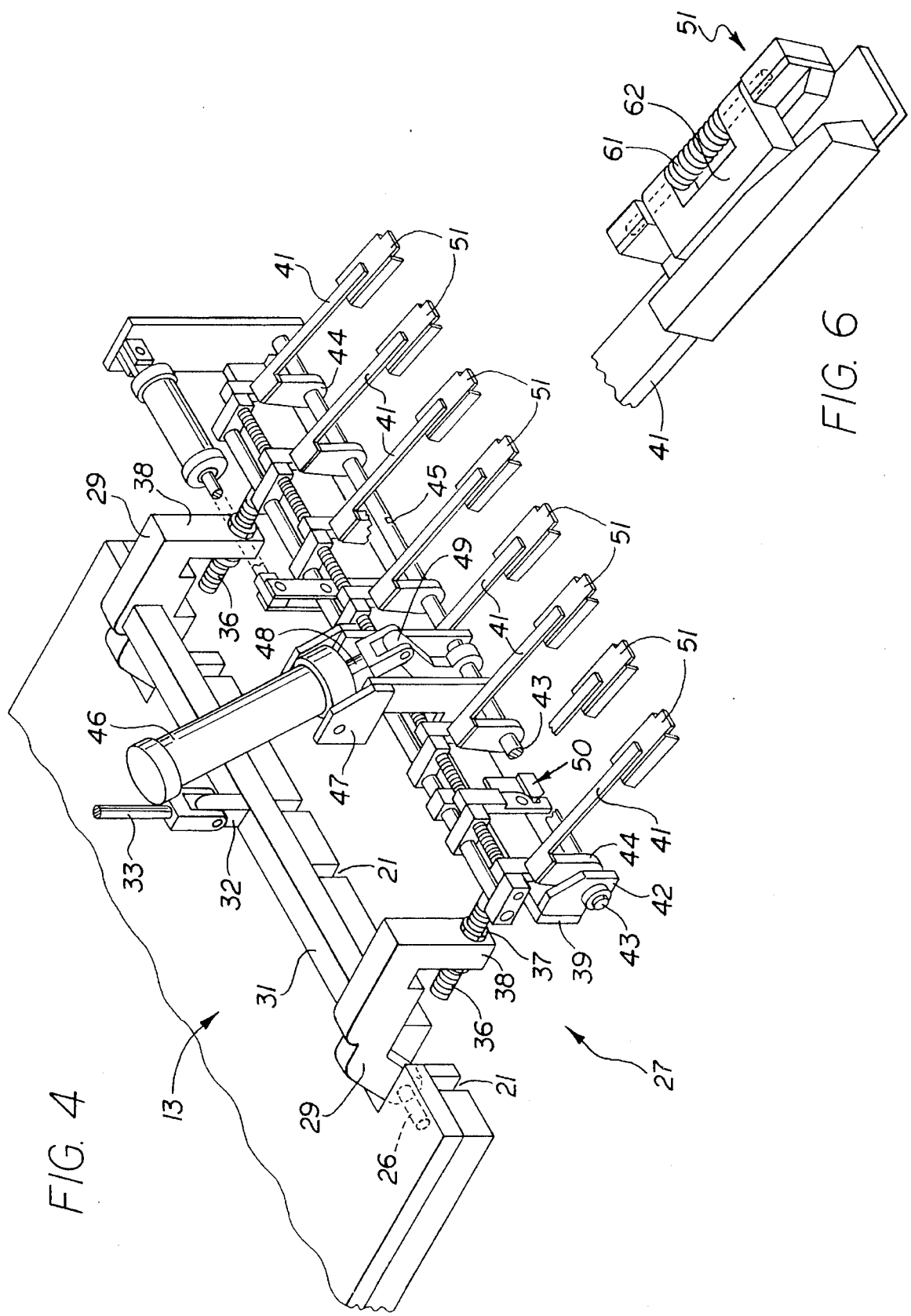
FIG. 4 is a top perspective view of the load side of the automatic bale tying apparatus.

As seen in FIG. 4, pivot members 29 support threaded rods 36 at the outer free end thereof with adjustment nuts 37 provided to secure the rods 36 in sleeves 38 formed in the pivot members. On the load side, the threaded rods 36 are connected to a support bar 39 on which a plurality of load fingers 41 are mounted. The support bar 39 carries a pair of bearing blocks 42 at each end through which a load finger actuating shaft 43 is rotatably mounted. Each load finger 41 is connected to the shaft 43 by a finger mount 44 which is rigidly affixed to one end of the load finger 41 and to the shaft 43 such that the finger 41 is held in offset spaced relation to the shaft. Rotation of the shaft 43 and thus concomitantly the fingers 41 is controlled by an air cylinder 46 supported on a cylinder bracket 47 mounted on the support bar 39. Air cylinder 46 has an extendable rod 48 connected to a finger actuator 49 affixed to the shaft 43, such that extension and retraction of the cylinder rod 48 urges the actuator 49, shaft 43, and fingers 41 through an arc. Bracket 47 may include a stop bar which limits the range of travel of the assembly.

Mounted to the support bar 39 intermediate the bar and the shaft 43 is an anvil block assembly 50 including an anvil for each load finger. The operation of the anvil assembly is similar to that taught in the '518 patent and is actuated to clamp the wire ties in place during selected operations of the apparatus.

Carried on the end of each load finger 41 is a wire engaging mechanism 51. In the preferred embodiment, the mechanism is similar to the device taught by Trumbo in U.S. Pat. No. 3,863,558 which is incorporated herein by reference. The present device shown in FIG. 6 incorporates a biasing spring 61, hingedly mounted gate 62, and internally formed surfaces to guide the loops on the ends of the wire tie, but does not incorporate the magnetic aspects of Trumbo. Further, Trumbo disclosed a manual insertion system wherein the wire tying surfaces were formed in the upper platen structure. Accordingly, applicants have significantly modified Trumbo to mount the wire tying surfaces on the end of an articulated arm.

In an alternate embodiment shown in FIGS. 8–10, the tying mechanism is somewhat simplified. The end of the load finger 41 distal the mount 44 carries a knotter 63 which is open faced. The knotter includes a housing 64 attached to the finger 41 and defining a substantially elongated U shape, being open at both ends. A longitudinal groove 66 is formed in the knotter 63, slightly offset from the center thereof, with opposing inclined surfaces 67 bordering the groove 66 and widening to define the elongated opening of the groove 66. When the arm and finger assembly are each in the full raised position, the groove is downwardly opening and when both are fully articulated the knotter is positioned with the groove opening upwardly. Near the end of housing 64 distal the finger mount 44, we provide a finger assembly 70, affixed within the housing and aligned with the groove to accept a hook of a wire tie as the length of the tie lies in the groove. Finger assembly 70 is machined to include a finger 71 and an arcuate slot 72 opening in orthogonal directions such that the hook of a wire tie may be received therein between the finger 71 and the body of the assembly. A secondary arcuate surface 73 on the assembly is substantially concentric with the arc of the arcuate slot and defines a some what conic surface tapering away from finger 71.

Figure 5:
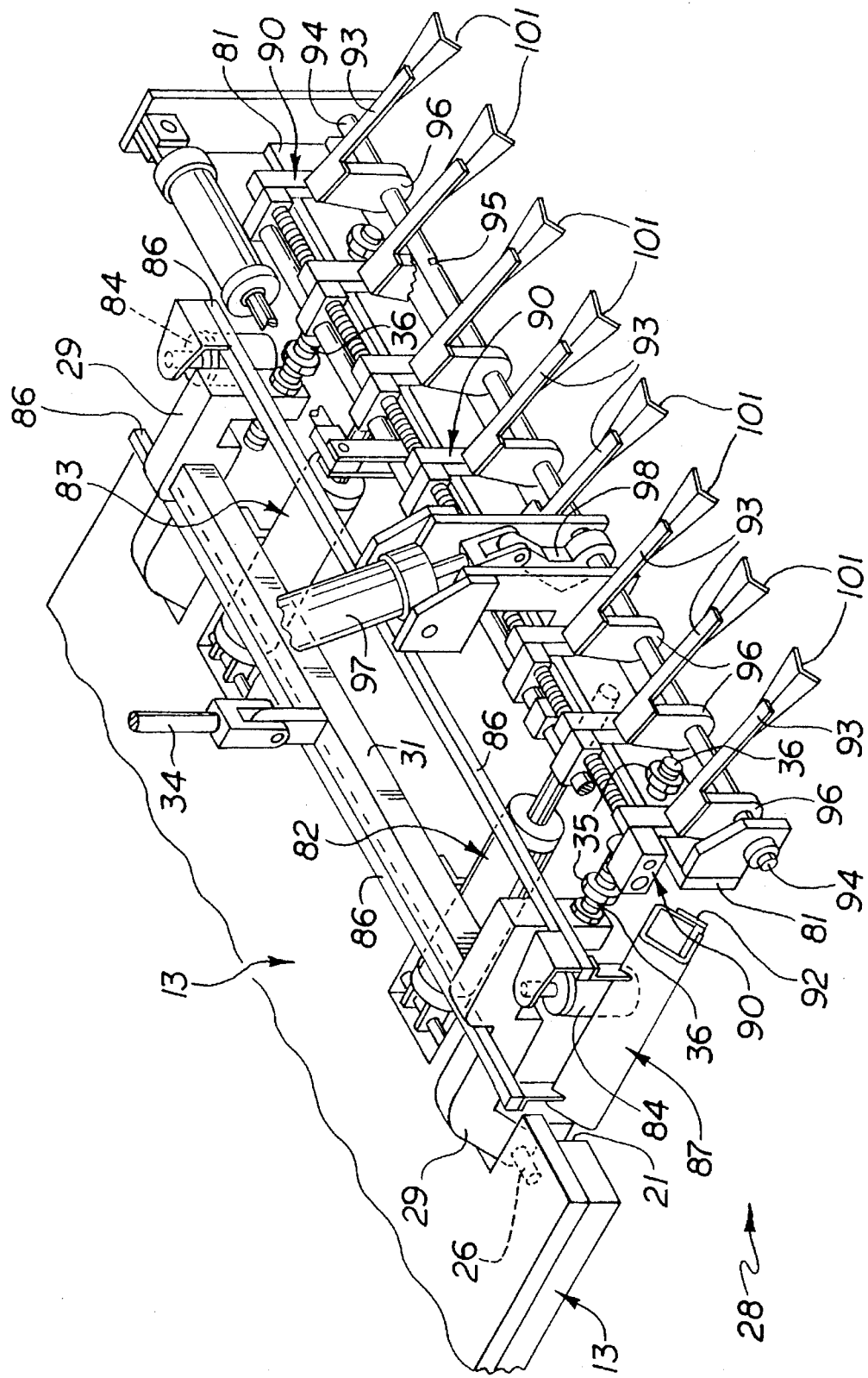
FIG. 5 is a top perspective view of the exit side of the automatic bale tying apparatus.

On the exit side of the platen, shown in FIG. 5, threaded rods 36 are not fixedly attached to support bar 81, but rather extend through apertures therein. Adjustable stop nuts 35 are attached to threaded rod 36 on each side of support bar 81 to limit the range of movement of the support bar 81. Stretch cylinders 82 and 83 are affixed by brackets to tubing 31 and are connected to support bar 81 to tension the wire across the top of the bale. Mounted to the pivot members 29 are a pair of wire lift cylinders 84 which lift a frame 86 beneath which are suspended a plurality of exit tubes 87 through which the wire ties pass. Each exit tube is aligned with a channel through the platen assembly 13 and an exit finger 93. Each channel has an open slot 92 overlain by a flexible flashing to permit egress of the wire tie at the appropriate time. Affixed to support bar 81 and aligned with the exit tubes are a plurality of anvil assemblies 90 of the same construction as on the load side of the apparatus. Also mounted to the support bar 81 in the same manner as heretofore described are a plurality of exit fingers 93, and exit finger shaft 94, exit finger mounts 96, and exit finger air cylinder 97, an exit finger actuator 98, all of which cooperate in the same manner as complimentary components on the load side of the apparatus. The exit finger terminus is, however, significantly different from the load side. Attached to the end of the exit finger distal the shaft 94 is a wire guide 101 which is essentially a V-shaped trough which, when the arms and fingers are articulated, is properly aligned to present a looped end of a wire tie to the wire closing mechanism on the load finger. A clearer understanding of the improvement over the prior art will be had from a review of the operation of the apparatus.

While a bale B is being made up for tying the human operator inserts a tie T into each of the channels 21 through the platen assembly 13 and through the exit tubes 87 while the arms and fingers are in their fully extended positions. The operator then engages the hook of each tie on the load side 27 of the machine with an associated tying mechanism, positioning the hook on a finger or detent such that it cannot be retracted toward the press. On the load side, positioning the tie in such a manner requires the wire to be positioned for engagement by the anvil assembly 50; however, the relative position of the load finger mounts, anvils and load finger shaft require that the shaft 43 have a plurality of downwardly opening slots 45 through which the wires pass from the anvils to the tying mechanism. On the exit side 28 of the platen assembly, the wires rest in exit tubes 87 subjacent the anvil assembly 90 and similar slots 95 in the exit finger shaft 94. When all the ties are engaged, the operator activates the control circuit which causes the wire lift cylinders 84 to lift the exit tubes 87 and hence the wires into registry with the exit anvils 90 and the slots in the exit arm shaft. Subsequently, the anvils close on the wires. Cylinders 46 and 97 are actuated to urge the fingers about the axis of the finger mounting shafts; however, it should be noted that this action imparts a gentle curve to the wire ties rather than the sharp bend of the prior art. This gentle curve also maintains the wire loops on the load side in proper engagement with the wire engaging mechanism 51. Cylinder 33 is then actuated to move the load fingers downwardly toward the transverse cavities 15 formed in the follow block assembly 14. Note that the cavities must accommodate without contact the load fingers 41 inasmuch as the wire tie remains engaged on the tying mechanism as the arm and fingers traverse the arc. As the load fingers move toward the cavities, cylinder 34 is actuated to urge the exit arms 28 and hence exit fingers 93 toward the cavities 15 which develops slack in the wires. The stretch cylinders 82 and 83 then extend to pull the wires snugly around the bale. The exit arm and fingers continue to move until the exit fingers are fully into their final position in the cavities 15. The cylinder 33 then moves the tying mechanism on the load fingers into the cavities 15 guiding the exit side wire loops into knotted engagement with the load side wire loops. For a reliability check, the process may be performed with the follow block 14 in a lowered position such that it does not obscure a full view of the critical loop joining operation. In either a test mode or baling mode, withdrawal of the arms and fingers leaves the loops of the tie engaged, as is well known in the art and the ties are readily removed from the platens through the platen slots 16.

While we have shown our invention in various forms, it will be obvious to those skilled in the art that it is not so limited but is susceptible of various changes and modifications without departing from the spirit thereof.

What we claim is:

1. In a baling press having opposing platen assemblies for compressing baleable material therebetween, the improvement comprising:
   (a) a first set of articulated guide members associated with one side of a first platen assembly;
   (b) a second set of articulated guide members associated with an opposite side of said first platen assembly, each of said first and second set having the members thereof aligned with the members of the other set;
   (c) a plurality of wire channels passing through said first platen assembly intermediate said aligned members;
   (d) a plurality of knot channels extending through an opposing platen assembly in alignment with said wire channels, said knot channels sized to receive a distal portion of said aligned members therewithin;
   (e) a wire knotting means carried on the distal end of each articulated member of one of said sets of articulated members adapted to engage a first formed loop in the end of a wire baling tie and retain said first loop in engagement as said articulated member moves into registry in an associated knot channel; and
   (f) guide means affixed on the distal end of each aligned articulated member of the other set for guiding a second formed loop at an opposite end of said tie into knotting position for engagement with said first formed loop engaged by said wire knotting means with said wire tie extending about a formed bale through said wire channels into said knot channels.

2. The improvement as defined in claim 1, wherein said first and second set of articulated members include a set of arms pivotally mounted to said first platen assembly and a set of fingers pivotally mounted to said set of arms, said sets of arms and sets of fingers being selectively movable between a load position extending outwardly from said first platen assembly and a knotting position with said fingers incorporating means to join said first formed loop with said second formed loop within said knot channels in said opposing platen assembly.

3. The improvement as defined in claim 2, wherein said set of fingers are connected to said arms by a continuous pivot shaft having a plurality of recesses therein aligned with each of said fingers and said wire channels, said recesses adapted to permit said wire tie to extend therethrough.

4. Apparatus as defined in claim 2, wherein said knotting means comprises a body associated with each finger of said plurality of fingers on one side of said first platen assembly and having a groove formed therein for receiving a looped end of a wire tie such that said looped end is urged concomitantly with said body as said knotting means is carried on said articulated members into engagement with a second looped end at the opposite end of said tie.

5. Apparatus for connecting a plurality of wire ties around a bale compressed between an upper platen and a lower platen, comprising in combination:
   (a) a plurality of downwardly opening wire channels extending transversely across said upper platen for receiving a wire tie therein;
   (b) a plurality of upwardly opening knot channels extending transversely across said lower platen in alignment with said wire channels;
   (c) articulated means for urging the ends of a plurality of wire ties received within said wire channels in said upper platen downwardly about a bale of compressed material between said upper and lower platens into said knot channels: and, (d) knot means carried on said articulated means for positioning the ends of said ties in knotted relationship within said knot channels.

6. Apparatus as defined in claim 5, wherein said articulated means comprises: articulated members including a set of arms pivotally mounted to said upper platen and a set of fingers pivotally mounted to said set of arms, said sets of arms and sets of fingers being selectively movable between a load position extending outwardly from said upper platen and a knotting position wherein said fingers position said tie ends in said knotted relationship within said knot channels in said lower platen.

7. Apparatus as defined in claim 6, wherein said fingers are connected to said arms by a continuous pivot shaft comprising a plurality of recesses therein aligned with each of said fingers and said wire channels, said recesses adapted to permit said wire tie to extend therethrough.

8. Apparatus as defined in claim 7, wherein said articulated means further comprises:
(a) finger mounts having first and second ends, wherein said first ends are rigidly attached to said pivot shaft and said second ends are rigidly attached to said fingers so as to maintain said fingers in an offset spaced relationship with said pivot shaft as said fingers pivot around said pivot shaft; and
(b) holding means on distal ends of said fingers for holding said wire tie ends in a fixed longitudinal position relative to said holding means as said fingers pivot around said pivot shaft.

9. Apparatus as defined in claim 5, wherein said upper platen and said lower platen are both movable vertically.

10. Apparatus as defined in claim 5, wherein said knot means comprises a body associated with each finger of said plurality of fingers on one side of said upper platen and having a groove formed therein for receiving a looped end of a wire tie, such that said looped end is urged concomitantly with said body as said knot means and said looped end are carried on said articulated means into engagement with an opposite wire looped end in said lower platen.

11. Apparatus as defined in claim 10, wherein said knot means further comprises guide means affixed on the distal end of each finger of said plurality of fingers on the opposite side of said upper platen aligned with an associated body for urging a formed loop at an opposite end of said tie into engagement with said formed loop engaged by said knot body within said knot channel with said wire tie extending about a formed bale through said wire channels into said knot channels.

12. Apparatus for connecting a plurality of wire ties around a bale compressed between a first and second platen, comprising in combination:
(a) a plurality of wire channels extending transversely across said first platen opening toward said second platen for receiving a wire tie therein;
(b) a plurality of knot channels extending transversely across said second platen opening toward said first platen in alignment with said wire channels;
(c) articulated means for urging the ends of a plurality of wire ties passed through said wire channels in said first platen about a bale of compressed material between said first and second platens into said knot channels: and, (d) knot means carried on said articulated means for positioning the ends of said ties in knotted relationship within said knot channels.

13. Apparatus as defined in claim 12, wherein said articulated means comprises: articulated members including a set of arms pivotally mounted to said first platen and a set of fingers pivotally mounted to said set of arms, said sets of arms and sets of fingers being selectively movable between a load position extending outwardly from said first platen and a knotting position wherein said fingers position said tie ends in said knotted relationship within said knot channels in said second platen.

14. Apparatus as defined in claim 13, wherein said fingers are connected to said arms by a continuous pivot shaft comprising a plurality of recesses therein aligned with each of said fingers and said wire channels, said recesses adapted to permit said wire tie to extend therethrough.

15. Apparatus as defined in claim 14, wherein said articulated means further comprises:
(a) finger mounts having first and second ends, wherein said first ends are rigidly attached to said pivot shaft and said second ends are rigidly attached to said fingers so as to maintain said fingers in an offset spaced relationship with said pivot shaft as said fingers pivot around said pivot shaft; and
(b) clamping means adjacent said pivot shaft for holding said wire tie in a fixed position such that natural bending of said wire tie as said fingers pivot around said pivot shaft does not cause longitudinal movement of said wire tie end relative to a distal end of said fingers.

16. Apparatus as defined in claim 12, wherein said first and second platen are both movable.

17. Apparatus as defined in claim 12, wherein said knot means comprises a body associated with each finger of said plurality of fingers on one side of said first platen and having locating means formed therein for locating a first looped end of a wire tie, such that said first looped end is urged concomitantly with said body as said knot means and said first looped end are carried on said articulated means into engagement with an opposite second looped end of said wire.

18. Apparatus as defined in claim 17, wherein said locating means is a groove formed such that said groove urges said first looped end rotationally to engage said second looped end in knotted relationship.

19. Apparatus as defined in claim 17, wherein said knotting means further comprises releasing means for releasing said wire loop ends after said first looped end is engaged to said second looped end.

20. Apparatus as defined in claim 17, wherein said knot means further comprises guide means affixed on distal ends of each finger of said plurality of fingers on the opposite side of said first platen aligned with an associated body for urging said second looped end of said wire tie into engagement position with said first looped end engaged by said knot body within said knot channel with said wire tie extending about a formed bale through said wire channels into said knot channels.

* * * * *